(12) United States Patent
Slater et al.

(10) Patent No.: US 7,792,753 B1
(45) Date of Patent: Sep. 7, 2010

(54) SYSTEM AND METHOD FOR IMAGE DEPOSITING, IMAGE PRESENTMENT AND DEPOSIT TAKING IN A COMMERCIAL ENVIRONMENT

(75) Inventors: Alan Slater, East Brunswick, NJ (US);
Michael L. Sears, Torrance, CA (US);
Phoebe Rin-Rin Hsu, Northridge, CA (US); Cuong D. Do, Reseda, CA (US);
H. Patrick McSharry, Los Angeles, CA (US); Edward M. R. Dudasik, West Hills, CA (US); Stephen M. Gryte, Los Angeles, CA (US); Robert O. Brooks, Los Angeles, CA (US)

(73) Assignees: Citibank, N.A., New York, NY (US);
Citicorp Development Center, Inc., Cincinnati, OH (US)

( * ) Notice: Subject to any disclaimer, the term of this patent is extended or adjusted under 35 U.S.C. 154(b) by 0 days.

(21) Appl. No.: 09/348,529

(22) Filed: Jul. 7, 1999

Related U.S. Application Data

(60) Provisional application No. 60/092,486, filed on Jul. 7, 1998, provisional application No. 60/092,487, filed on Jul. 7, 1998.

(51) Int. Cl.
*G06Q 40/00* (2006.01)
(52) U.S. Cl. .............................. 705/45; 705/35; 705/39; 705/42
(58) Field of Classification Search .................. 705/45, 705/35, 39, 42
See application file for complete search history.

(56) References Cited

U.S. PATENT DOCUMENTS 4,264,808 A   4/1981   Owens et al. ............... 235/379
4,270,042 A   5/1981   Case ........................ 235/379
4,321,672 A   3/1982   Braun et al. ................. 364/408
5,175,682 A   12/1992  Higashiyama et al. ....... 364/408
5,282,050 A * 1/1994   Ishizuka et al. ............. 358/400
5,373,550 A   12/1994  Campbell et al. ....... 379/100.11
5,431,389 A * 7/1995   Wensink et al. ............. 271/273
5,590,196 A * 12/1996  Moreau ....................... 380/18

(Continued)

FOREIGN PATENT DOCUMENTS

EP         0 029 733 A2     6/1981

(Continued)

OTHER PUBLICATIONS

NCR's ATM captures images at point of deposit, Financial Services Report, Jan. 20, 1993, vol. 10, No. 2.*

(Continued)

*Primary Examiner*—Daniel S Felten
(74) *Attorney, Agent, or Firm*—King & Spalding LLP

(57) ABSTRACT

A method and system provides for scanning a check and/or cash to create an electronic image of the front and the back of the check and/or cash. The image is then processed and transmitted electronically to a central location. The image may be recreated into a paper form at the central location, resembling the original paper check or cash, including a machine-readable regeneration of the MICR code line data captured from the original instrument. Paperless processing of checks and cash is thus provided, including local voiding and storage of the check without requiring immediate pickup, while still allowing the transaction to be process.

64 Claims, 10 Drawing Sheets

U.S. PATENT DOCUMENTS

| | | | |
|---|---|---|---|
| 5,594,225 A | 1/1997 | Botvin | 325/379 |
| 5,602,936 A | 2/1997 | Green et al. | 382/140 |
| 5,615,268 A | 3/1997 | Bisbee et al. | 380/25 |
| 5,677,955 A * | 10/1997 | Doggett et al. | 705/76 |
| 5,678,046 A * | 10/1997 | Cahill et al. | 395/616 |
| 5,748,780 A | 5/1998 | Stolfo | 382/232 |
| 5,751,842 A | 5/1998 | Riach et al. | 382/137 |
| 5,783,808 A | 7/1998 | Josephson | 235/379 |
| 5,832,463 A | 11/1998 | Funk | 705/35 |
| 5,870,725 A | 2/1999 | Bellinger et al. | 705/45 |
| 5,874,717 A | 2/1999 | Kern et al. | 235/379 |
| 5,897,625 A * | 4/1999 | Gustin et al. | 705/43 |
| 5,910,988 A | 6/1999 | Ballard | 380/24 |
| 5,940,844 A | 8/1999 | Cahill et al. | 707/526 |

FOREIGN PATENT DOCUMENTS

EP    0 616 296 A2    9/1994

OTHER PUBLICATIONS

European Search Report for Application No. EP 99 20 2212, completed on Oct. 29, 1999.

PCT Application No. SE97/01304, published by WIPO under International Publication No. WO 98/03942, Jan. 29, 1998.

\* cited by examiner

SYSTEM AND METHOD FOR IMAGE DEPOSITING, IMAGE PRESENTMENT AND DEPOSIT TAKING IN A COMMERCIAL ENVIRONMENT

CROSS-REFERENCE TO RELATED APPLICATIONS

This application claims priority to Provisional Applications Nos. 60/092,486 and 60/092,487, both filed Jul. 7, 1998, the disclosures of which are specifically incorporated by reference herein.

FIELD OF THE INVENTION

In one aspect, the present invention relates to the transfer and handling of printed checks and/or cash using electronic representations of the checks and/or cash, and in particular to a method and system for accepting, canceling, copying, transmitting, and creating Magnetic Image Character Recognition (MICR) encoded paper facsimiles of the checks, and verifying checks in an electronic manner that allows paperless or minimal paper use processing.

In another aspect, the present invention relates to providing banking institutions with the capability to process deposits for other banks, accepting deposits at merchant locations, and accepting transactions and checks from places like brokerage offices, businesses, lock boxes, overseas locations, and bank branches and offices.

In yet still another aspect, the present invention relates to a system and method of use for implementing an image deposit system, in particular, as used in a self-service customer environment which reduces deposit processing time and costs.

BACKGROUND OF THE INVENTION

Within the banking environment, checks are very heavily used as a method of payment for goods and services, and for the transfer of funds between people. One of the very significant costs that banks and businesses incur is the handling and transportation of checks between the business location and the bank, and between the depository bank and the paying bank.

More generally, the U.S. check payment system currently processes 65 billion items annually, and this number continues to grow even though various forms of electronic payments are increasing. As a result, the time to process such transactions, including crediting of deposits in customer accounts is getting greater and greater. Thus, there is a need to substitute, replace, or eliminate much of the transit or transportation costs associated with checks and to provide a method and system for paperless or minimal paper use processing.

In this context, the banking and the automatic teller machine (ATM) manufacturing industry has experimented with check image systems for a number of years with little success. Some of the reasons for the lack of success include the failure to properly design the ATM applications and hardware for a satisfying customer experience, as well as the failure to address the entire system, i.e., the depositing customer, the check payment system, the paying bank and the customer who wrote the check.

In accordance with the invention herein, the problems of the prior art, check imaging systems are avoided and a comprehensive system for imaging depositing, presentment and deposit taking in a commercial environment is provided. In part, this is possible because of existing point of sale, check acceptance devices, improvements in data bandwidth and transmission time for images available for ATM installation, and better image compression and Courtesy Account Recognition (CAR) software, all of which are commercially available, and which are implemented in the invention in a unique and novel system which overcomes a number of problems of the prior art.

SUMMARY OF THE INVENTION

It is thus one object of the invention to provide a method and system to image check items at an ATM, collect MICR code line and other information about the check and deposit account, and transmit the image and data directly to an image remote system capable for processing. Because the image can be substituted into the check processing system, pickup of the physical items can be delayed or eliminated, resulting in large cost savings and improvements in payment settlement time.

It is another object of the present invention to overcome the problems of the prior art by providing a method and system for copying and transferring checks electronically and then creating an MICR encoded paper facsimile of the check or using another paperless method to enter the check into the check collection system.

It is a further object of the present invention to accept and cancel a paper check, including providing a method for reproducing a check that has been scanned.

Yet still further, it is an object of the present invention to verify checks in an electronic or other paperless manner.

It is a further object of the invention to provide a paperless method to enter a check into the check collection system, accept deposits of one bank for other banks, accept deposits at merchant locations, and accept transactions and checks from places like brokerage offices, businesses, lock boxes, overseas locations, and bank branches and offices.

It is still another object to accept and cancel a paper check, to provide a method for reproducing a check that has been scanned, and regenerating the originally captured MICR code line data on the paper reproduction to verify checks in an electronic or other paperless manner.

A still further object is to provide the capabilities discussed previously for cash transactions.

One embodiment of the present invention solves the problems of the prior art by scanning a check to create an electronic image of the front and back of the check, capture the MICR code line data through magnetic or optical character recognition (OCR) technology, and then processing and transmitting the scanned check and captured MICR code line data electronically to a central location. The electronic image is recreated into a paper form resembling the original paper check, and the paper form is MICR encoded. In another embodiment, paperless transactions for checks is accomplished, and variability between paper and paperless check processing is possible in order to enable bank evolution to paperless transactions. Optionally, the check is presented in an electronic access location, such as an automatic teller machine (ATM), a customer access terminal (CAT), or other check scanning depository terminal connected to a network. The same can be done with cash.

Yet still another embodiment provides for scanning a check to create an electronic image of the front and back of the check and captured MICR code line data, and transmitting the scanned check and data electronically to a central location of one bank, accepting deposits at merchant locations, accepting deposits of one bank for another, and accepting transactions and checks from places like brokerage offices, businesses, lock boxes, overseas locations, and bank branches and offices. In one embodiment, the electronic image is recreated into a paper form resembling the original paper check, and the paper form is MICR encoded with the regenerated MICR code line data previously captured from the original check item. While the invention is generally described in terms of being implemented with instruments such as checks, it is possible to allow similar processing of cash transactions where the cash note is scanned in and held in a secure location, while appropriately prepared images of the scanned note are used to process the transaction electronically.

Thus, in one specific aspect, the invention relates to a method for image based transactions. An instrument or cash is received at a first location, with the instrument or cash having a front face and a back face. The front face and the back face of the instrument or cash are scanned to create a deposited instrument or electronic validation of deposited cash. The scanned deposited instrument or cash is transmitted from the first location to a second location and a transaction is then processed with the scanned deposited instrument or electronic validation of deposited cash.

In another aspect, the invention relates to a system for conducting image based transactions. A scanner is provided at a first location which is configured for scanning the front face and the back face of either an instrument or cash, for creating a deposited instrument or electronic validation of deposited cash. Means are provided for transmitting the scanned deposited instrument or electronic validation of deposited cash from the first location to a second location. Such means can include conventional existing transmission technology such as is used in a network environment including a public network such as the Internet, and involves commercially available and well-known electronic, computer and software tools. Means for receiving the transmitted scanned deposited instrument is provided at the second location. Such devices used for receiving are conventional, commercially available, and well-known to those of ordinary skill in the art. At the second location, there is provided means for processing a transaction with the scanned deposited instrument or electronic validation of deposited cash. Such means can also involve conventional computer technology and database technologies for allowing processing of the transaction in a desired manner.

BRIEF DESCRIPTION OF THE DRAWINGS

Having briefly described the invention, the same will become better understood from the following detailed discussion thereof, made with reference to the appended drawings, wherein:

FIG. 11 illustrates an original check and an MICR image.

DETAILED DISCUSSION OF THE INVENTION

Figure 1:
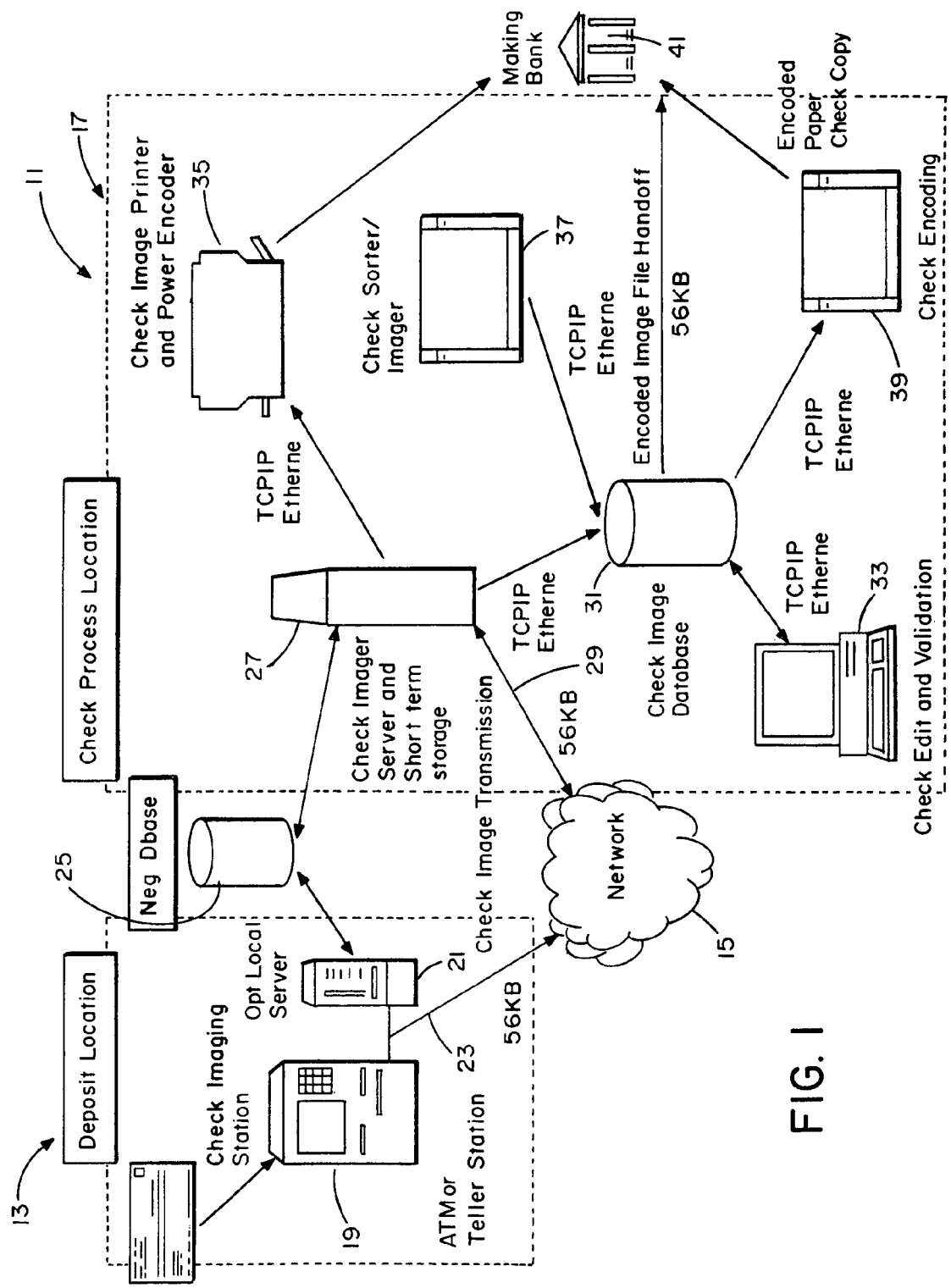
FIG. 1 is a block diagram of a high-level system architecture showing instrument, in particular, check imaging process flow as implemented in accordance with the system of the invention.

A general system overview of the invention is shown in FIG. 1 as system 11. FIG. 1 generally shows a deposit location 13 connected through a network 15, or directly, to a database 25 and to a check processing location 17. The deposit location 13 includes a check imaging station which can be an ATM or teller station 19 which is used to scan in the check, and to capture the MICR code line data via magnetic or optical character recognition (OCR) hardware and software technology, and either transmit it through a connection 23 to the network, which then in turn connects to a check imaging server 27 providing short term storage at the check process location 17, or transmits to an optional local server 21 connected to a negative (fraud and loss detection) database 25, which transmits the check image to the check imaging server 27. The check image can then be transmitted to a check image database 31 connected to the server 27 for manipulation at a terminal 33. At the terminal 33 check editing and validation can be conducted. Similarly, a check encoder 39 can serve to encode the check or alternatively the check can be encoded automatically based upon the scanned image, and generate a paper check copy for transmission to a making bank 41. A check printer 35 is connected to the server 27 from where check images can be printed and transmitted to the making bank 41. Similarly, a check sorter/imager 37 can be connected to the image database 31 for providing appropriate sorting functionality.

Figure 2:
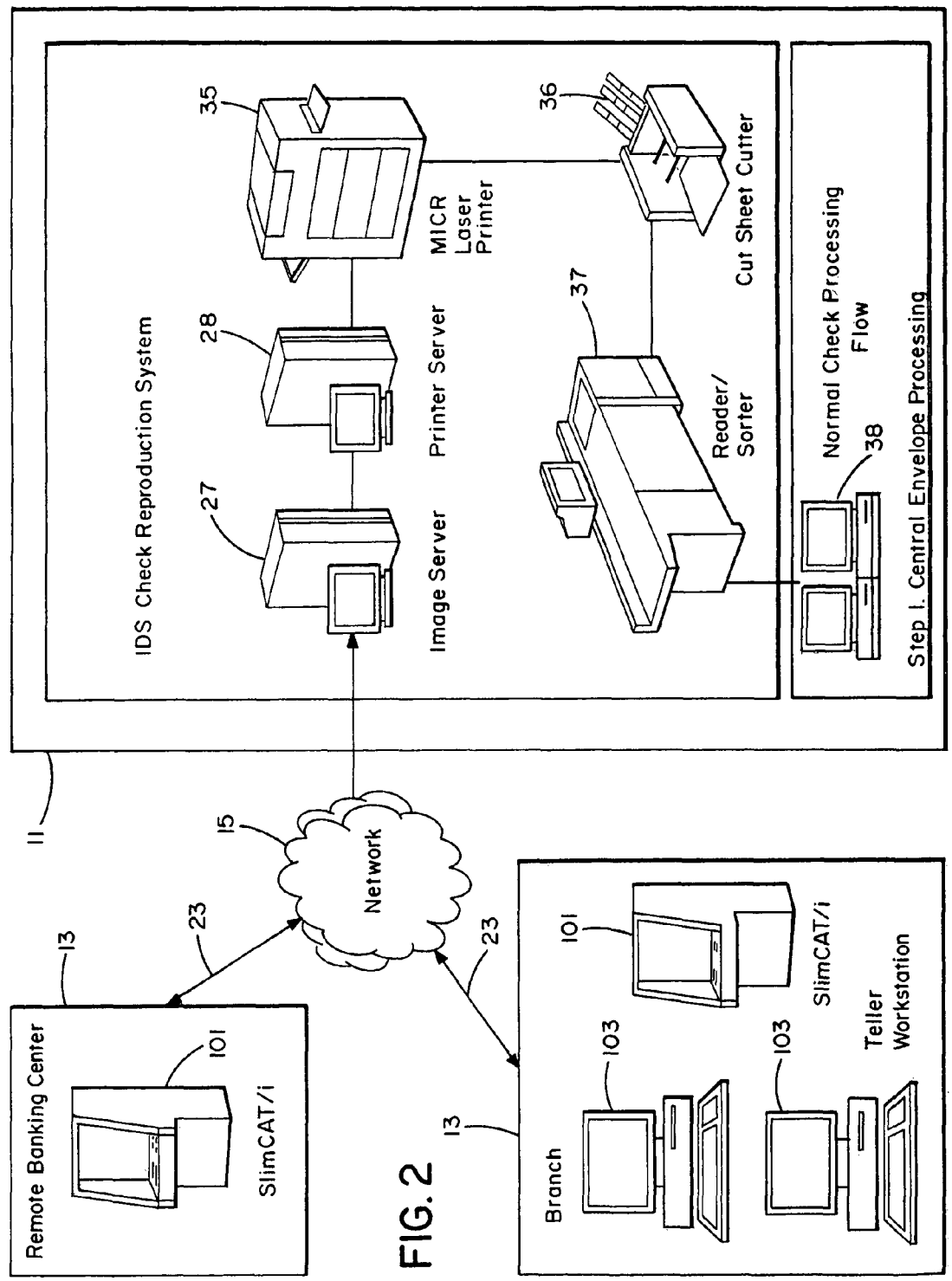
FIG. 2 is a more detailed block diagram showing the various components implemented in the system of the invention, which is more generally illustrated in FIG. 1.

Certain aspects of the system of FIG. 1 are further illustrated in greater detail in FIG. 2. For instance, an alternative to an ATM can be a customer access terminal (CAT) 101 which can be the deposit location 13 at the remote banking center. The CAT 101 will have a scanner or check imager in place of a traditional envelope deposit slot as currently used in automatic teller machines. In addition, the CAT will also include a cash acceptor/validator as well as a cash dispenser to provide functionality similar to automatic teller machines currently in use. Thus, in accordance with its use, the CAT 101 is configured to accept check or cash deposit items with no envelope. Two separate cash and check entry points may be used, but alternatively, a single entry point check scanner/validator can be used as may be readily apparent to those of ordinary skill in the art. Such a device would combine conventional image scanning, magnetic and optical character recognition, and bank note validation hardware and software into a single device.

The CAT can be programmed to validate check items through MICR code line and OCR software. When a check is scanned in, an image of each check is presented on the customer display. The customer can then, using an appropriate keyboard, input the check amount. The CAT can then determine the check amount through a combination of Courtesy Account Recognition (CAR) software and Legal Amount Recognition (LAR) software, for improved confidence. A comparison between the scanned amount and the entered amount is made, and if there is a match, the transaction proceeds. If the customer's input and the courtesy amount recognition differ, even after a customer's second input, the system will send the check image to a customer service operator who will be able to read the check and resolve any discrepancies.

A printer within the CAT 101 serves to print a transaction record with an image of selected elements of the check. The CAT 101 then compiles deposit information such as the deposit account number, check courtesy amount, MICR code line data, cash deposit details, and the total deposit amount to produce a facsimile of a deposit slip for a check processing center. The CAT is programmed to compress, encrypt and digitally sign the check image for transmission to a secure processing center through a connection 23 to a network 15, which in turn connects through a connection 29 to the check processing center 11.

Alternatively, the deposit location 13 can be a bank which can include teller work stations 103, including scanners and/or a CAT 101 as previously described. Such a deposit location 13 would also be connected through a connection 23 to a network 15 and/or a connection 29 to the check processing center 11.

As discussed with respect to FIG. 1, certain common elements are interconnected as shown in greater detail in FIG. 2. Optionally, the image server 27 is connected to a printer server 28 which serves to control the check image printer 35, in this case a MICR laser printer. As the check images are printed, a single sheet of the check images is provided to a sheet cutter 36 for cutting the individual check images which are then provided to a reader/sorter 37 which is connected to a central envelope processing unit 38 for what is then normal check processing flow with the images, which would ordinarily have been done with the original checks after pickup from the deposit locations 13.

Thus, as may be appreciated, in an embodiment of the present invention, a device scans the check to create an electronic image of the front and the back of the check, captures the MICR code line data using magnetic and/or optical character recognition technology, and then processes and transmits the scanned check electronically to a central location. Based upon the payor bank information transmitted to the central location, the payor bank's desired method of payment is determined. The depository bank sends out the instrument for collection as either an ACH item, and ECP entry, a scanned image or a paper item. The electronic image is recreated into a paper form resembling the original paper check, and the paper form is MICR encoded by regenerating the captured MICR code line data from the original check scanning process. In accordance with the system, a check can be scanned and subsequently presented locally (in the same region as the payor or bank), which reduces the flow from the Federal Reserve system resulting from the transportation of checks between clearing houses and branches of the Federal Reserve regional check processing centers.

Thus, when a customer uses the system, with an ATM/CAT, the customer who desires to deposit a check follows the following procedure. The customer accesses an electronic access device, such as in an ATM/CAT, by for example, swiping a user card. The access device queries the customer as to whether the customer wants to make a deposit, and the customer indicates affirmatively that he wishes to make such a deposit. The access device then provides an instruction to the customer to input the check or cash into a slot. The front and the back of the check are then scanned, the MICR code line data is captured, and an image of the check is presented to the customer. A courtesy and/or legal amount recognition, i.e., an electronic reading of the amount the customer has written on the check, is then made using readily available software, and the customer is asked to enter the amount of the check, for example, through a keyboard or keypad. If the amount determined by the access device and the amount entered by the customer are the same, the access device accepts the deposit. If the amounts are different, the customer re-enters the number. If the amounts still disagree, in an embodiment of the present invention, the ATM/CAT transmits an image of the check to a customer service center, displays the check for an operator, and the operator resolves any discrepancy.

After the check has been accepted and the amounts have been determined to agree, the ATM/CAT stamps the check "VOID", or prints other appropriate language on the check to show that it is no longer negotiable, and then deposits the check into a locked depository. The voided checks are picked up periodically by a courier or by a banking institution.

There is no requirement that the voided checks must be picked up on a daily basis, because the actual checks are not needed for further banking activities as further described. Throughout the day, the ATM/CAT transmits the deposited images to a central location. From these digital images, the central location recreates the check onto paper in a format that looks similar to, or almost identical to, the original check. In an embodiment of the present invention, the processing facility MICR encodes the required information for check processing on the bottom of the check and enters the MICR encoded facsimile into the paper presentment flow by sending the reproduced facsimile to a local federal reserve check processing center to be sent subsequently to the paying banks.

Figure 3:
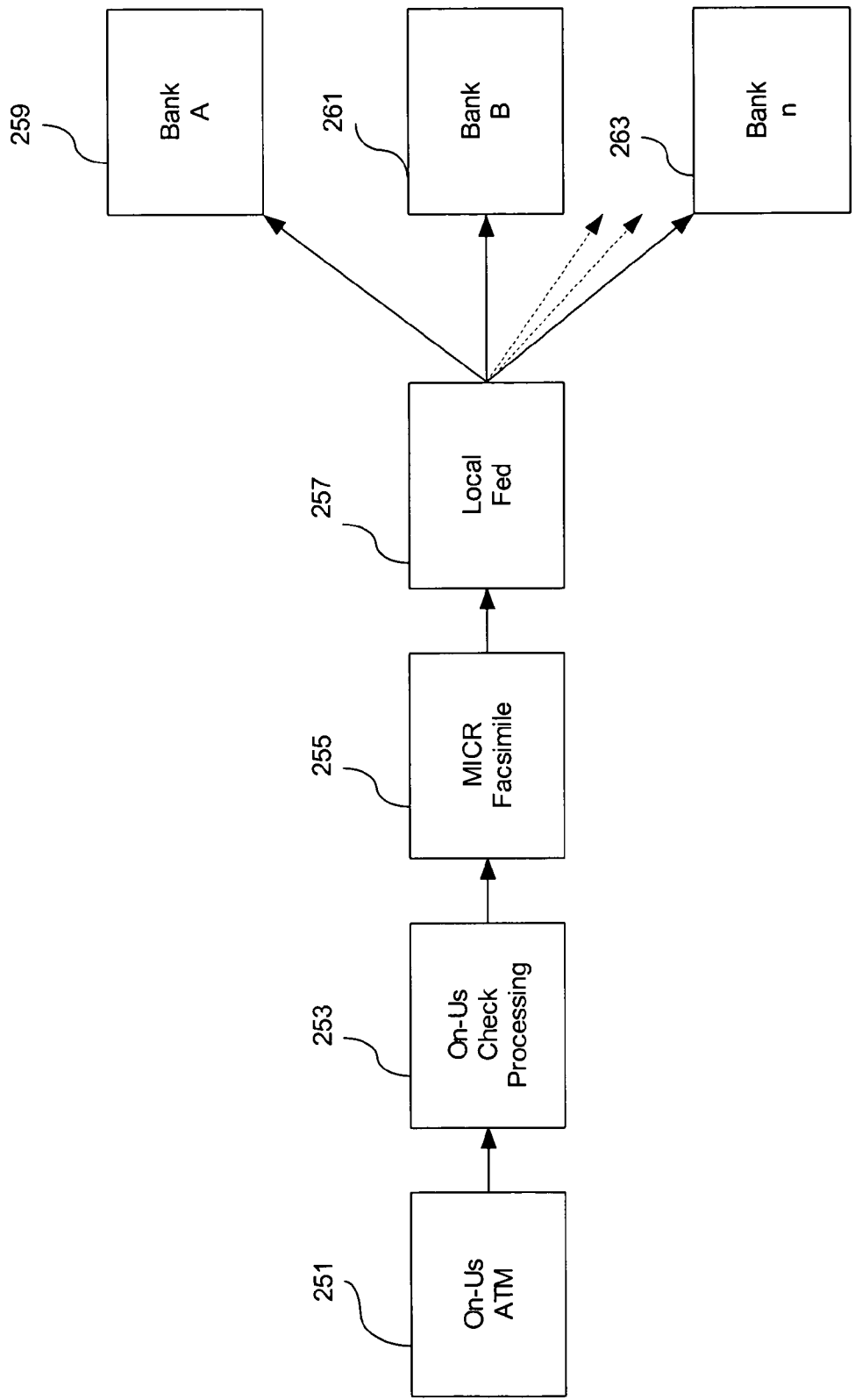
FIG. 3 is a block diagram illustrating MICR encoded facsimile presentment.

This is more clearly illustrated by the block diagram of FIG. 3 in which the checks are scanned into a bank's ATM 251 and processed, as previously described, at block 253. An MICR facsimile is then generated at block 255 and the encoded facsimile is presented as paper at the local Federal Office 257 to then be sent to the paying banks 259, 261, 263.

Figure 4:
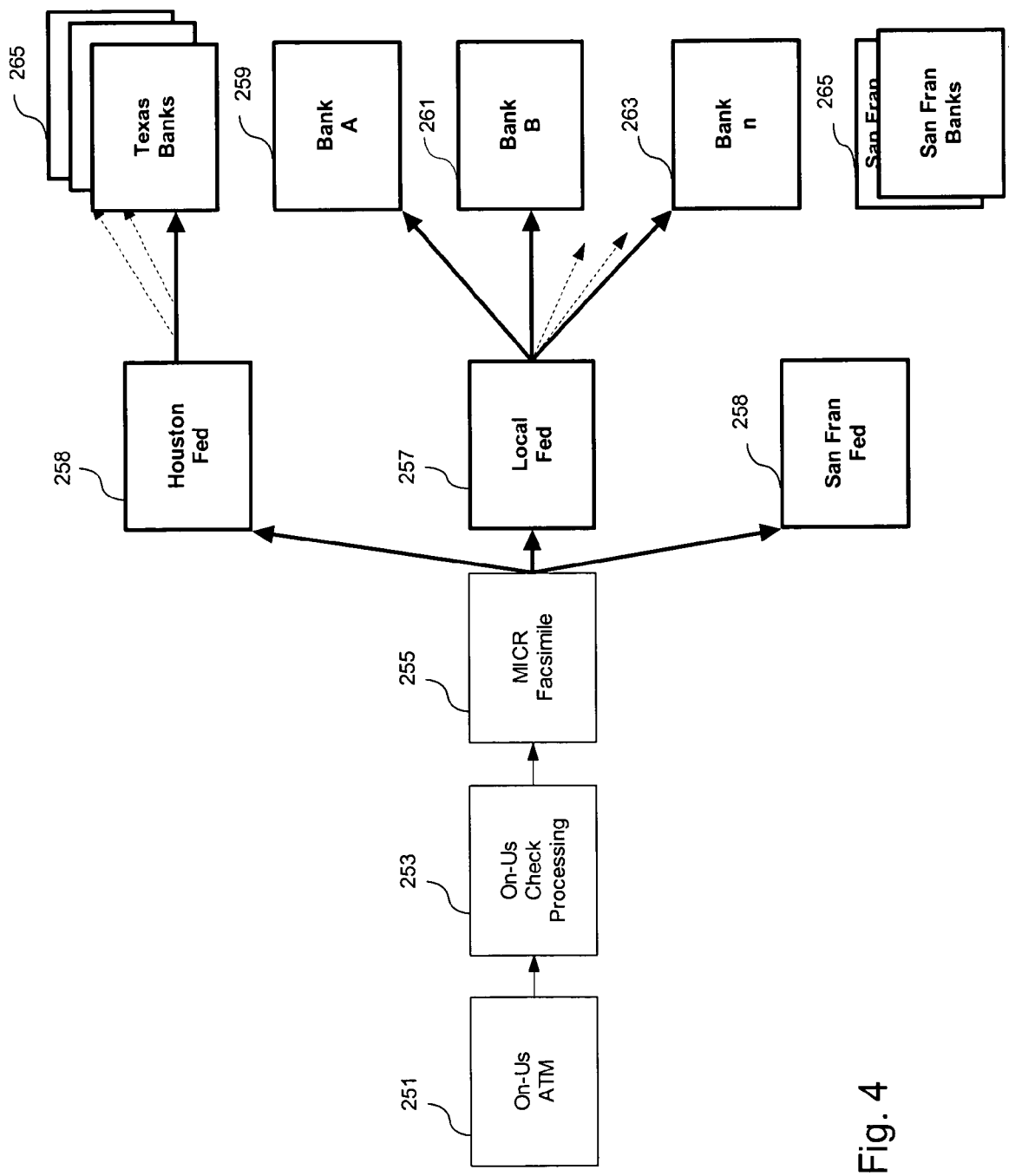
FIG. 4 is a block diagram illustrating local scanned image presentment to local banks.

In another embodiment of the invention, the check images, as illustrated in FIG. 4, are presented in a form in accordance with the location of the drawing bank. For example, if a check is drawn on a bank in the Houston area, the image itself would be sent directly to a facility in Houston such as the Houston Federal Office 258 to be sent subsequently to Texas banks 265. Similarly, the same could be done with the San Francisco Federal Office 258' for processing by local banks, in this case, San Francisco banks 265'. Specifically, the depository bank can send the electronic information directly to the payor bank or to another bank or service provider acting as the depository bank's representative to create the MICR encoded facsimile. In this embodiment, the time delay for the physical transportation of the piece of paper from, for example, the New York City area to San Francisco or Houston would be eliminated. Further, the availability of the funds to the depository bank from the deposited check would no longer be one or two days later, but would, in effect, be the same day or the next day. Thus, "float" is effectively minimized, and the risk associated with "float" to the Federal Reserve System is substantially reduced. As with the paper transmittal, in this embodiment, each of the clearing houses or local federal reserve bank offices that receive the check image, create a facsimile and send it out to local banks.

Figure 5:
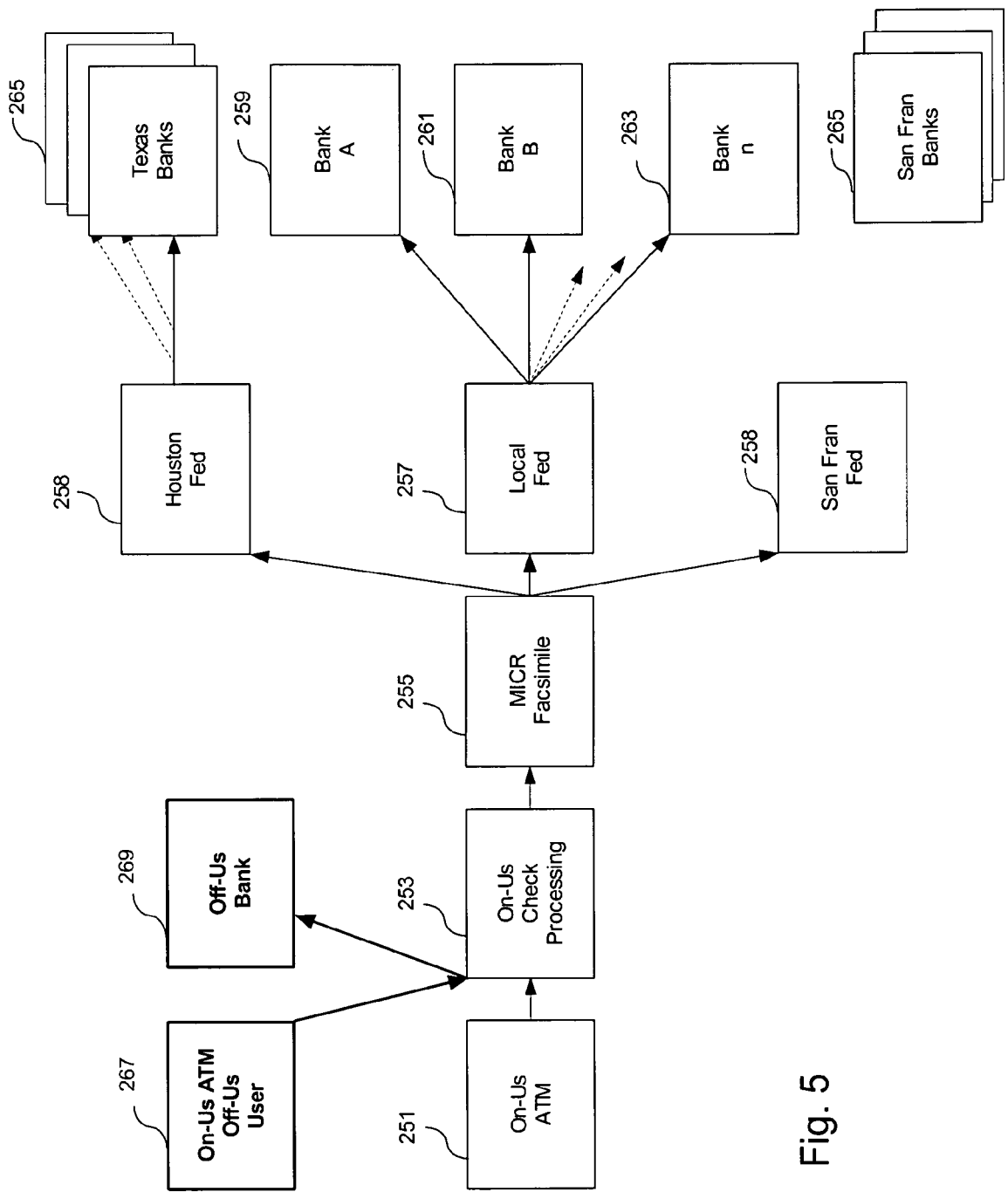
FIG. 5 is a block diagram illustrating scanned image presentment and shared deposit taken to local and nonlocal banks.

In another embodiment of the present invention, a system known as "shared deposit taking" is illustrated in FIG. 5. In an example of shared deposit taking, a user other than a customer of the banking institution that owns the ATM/CAT, accesses the ATM/CAT and makes a deposit in the same manner that the banking institution's own customer would make the deposit, i.e., for example, as shown at block 267 of FIG. 5. This is done from the user's access card and the banking institution discerns that the customer is the depositor of another banking institution. The banking institution for the ATM/CAT scans the deposited check, and then through a processing center or on-line network, sends the deposit record plus the image of the check to the user's bank 269. This function may be provided, for example, on a fee basis by the bank having the ATM/CAT, to the other banking institution.

In accordance with this aspect of the system, the banking institution having the ATM/CAT can have the option of not picking up deposited checks from the location every single day, and provides the ability to place ATM/CAT's in very remote locations, and still operate them economically.

Figure 6:
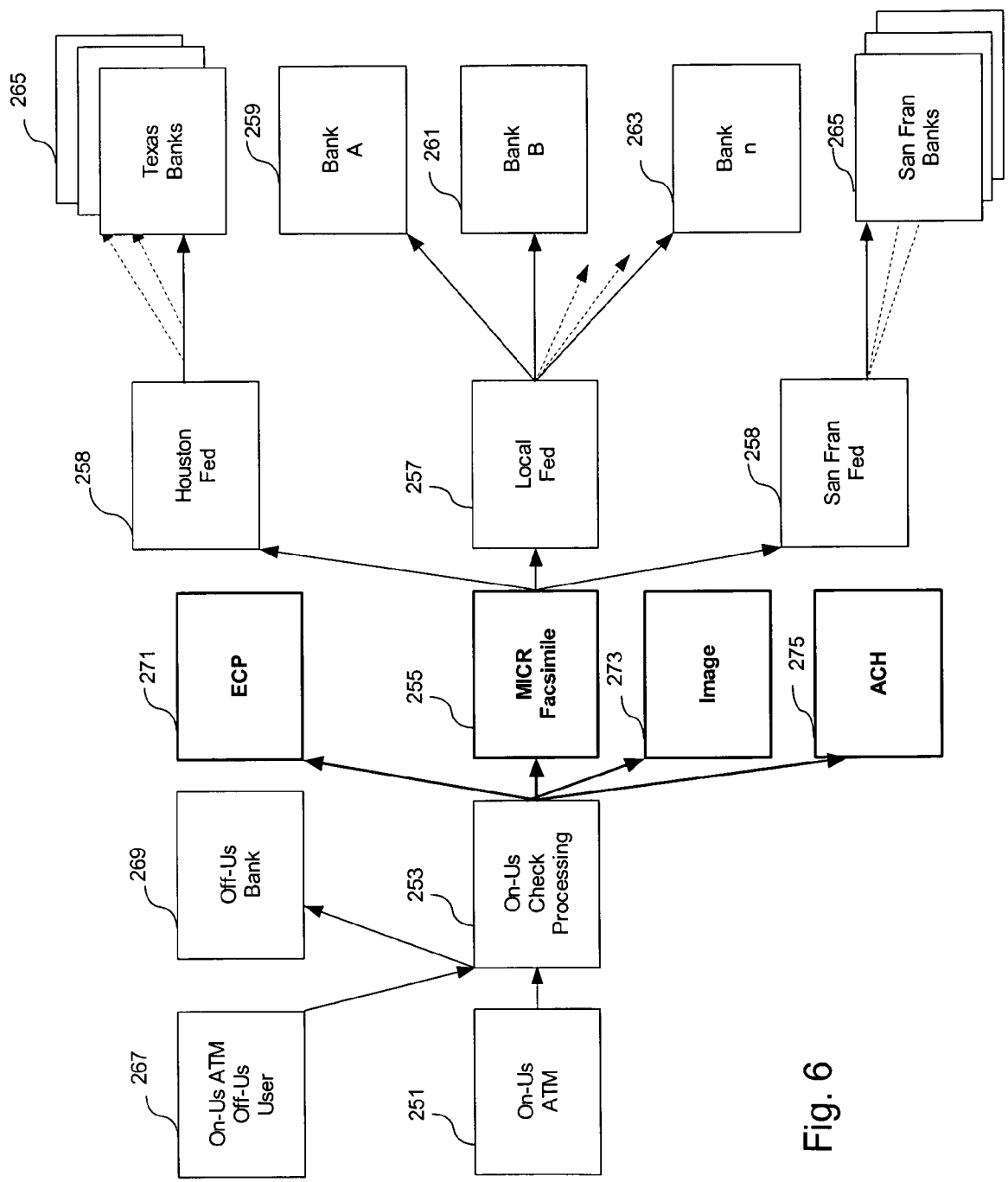
FIG. 6 is a block diagram illustrating presentment in various forms to accommodate the paying bank requirements.

In a yet still further aspect, as illustrated in FIG. 6, the paying bank can be provided with an option of how the bank would like presentment of items. For example, in another embodiment of the present invention, the processing facility that receives the check images identifies the bank and its routing transit number from the bottom of the check, looks up these numbers on a table, and determines whether the paying bank requires, for example, a paper check or an electronic check presentment (ECP) file as shown in block 271. Alternatively, a third party such as the Federal Reserve Bank or a clearinghouse could maintain the table. For purposes of this disclosure, it is noted that an ECP file is an electronic file of the MICR-band on the bottom of the check.

Another bank may want a full image file as noted at block 273, or in some cases an ACH ("Automated Clearinghouse") file as shown in block 275. As banks replace their hardware and software with higher level, more electronified processing, the present invention allows the entity maintaining the bank files to simply change the table entry to automatically change the preferred form for receiving the check. Thus, the present invention provides a method and system for transition from paper to electronics for every bank in the country.

Since the images are accepted electronically and scanned electronically, an opportunity is provided to analyze the checks at the time of deposit and determine whether various different types of fraud are being attempted. For example, the deposited checks could be compared against on-line files of "no good" checks, and certain types of counterfeits could be detected. A yet still further feature of the invention provides that a record of the check, such as a reduced size image printout is provided on the printed receipt, to the user at the ATM/CAT or presentment location immediately upon input of the check.

Figure 7:
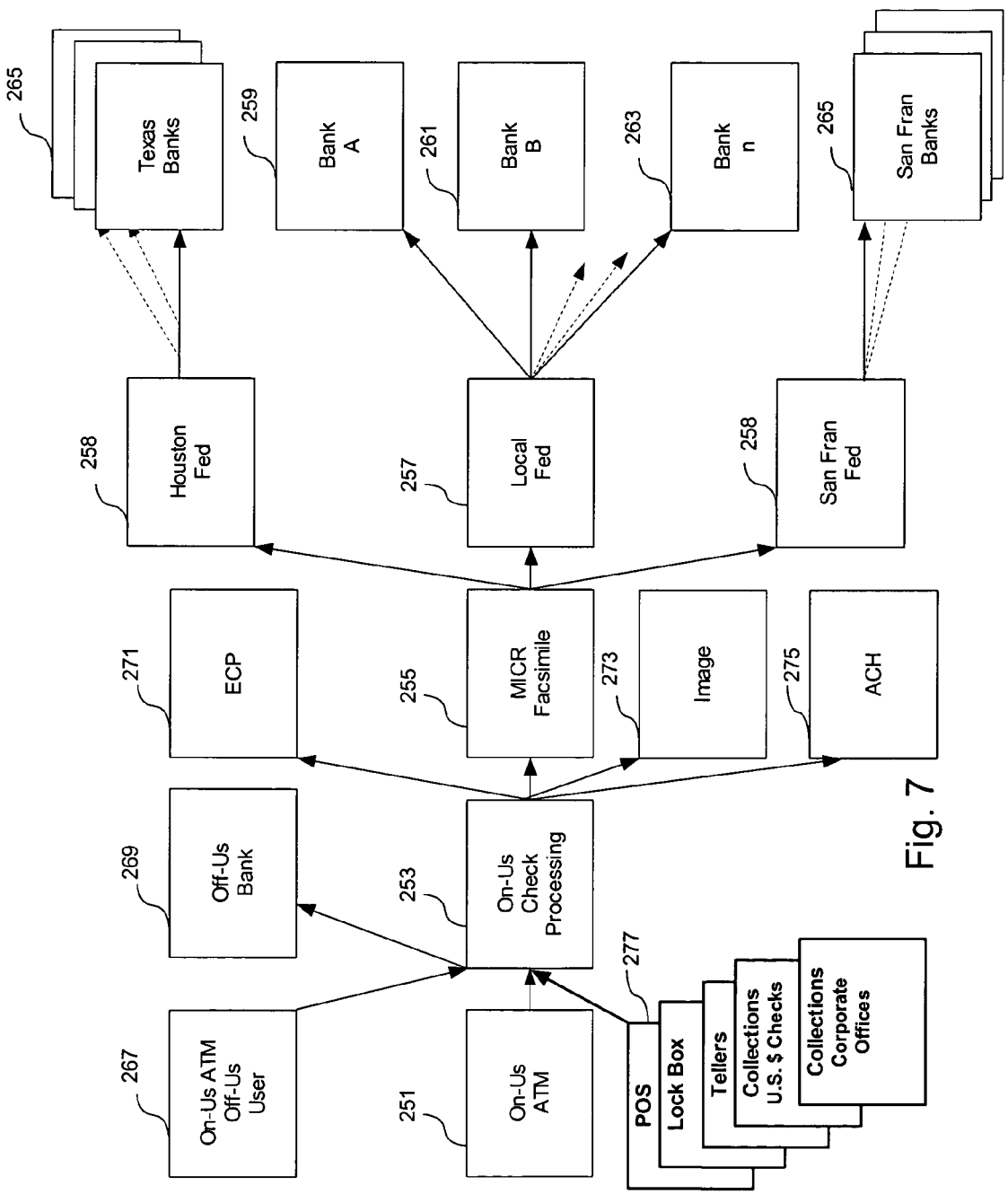
FIG. 7 is a block diagram illustrating scanned image presentment in combination with merchant deposit taking, lock box, and other forms.

In a yet still further embodiment as illustrated in block diagram form in FIG. 7, the invention provides banking institutions with the capability to process deposits for other banks, allows accepting of deposits at merchant locations, and accepting transactions and checks from places like brokerage offices, businesses, lock boxes, overseas locations, and bank branches and offices.

In this embodiment of the present invention, applications for the scanners are housed in non-automatic teller machine customer activated terminal (non-ATM/CAT) environments as shown in blocks 277 of FIG. 7. In an embodiment of the present invention, a device is provided that scans checks and places them into a locked depository. This allows the use of the device in a number of situations other than banking institutions, such as at merchant sites. A merchant can input and receive checks into the device or can accept deposits for banking institutions. Such checks are acceptable whether the checks are payable to the merchant or a deposit for the host or other banking institutions. The check images are scanned and then sent to the appropriate banking institution. In an embodiment for the lock box environments as illustrated in FIG. 7, which include commercial applications, as the checks are processed, they are scanned and automatically transmitted to a check processing facility or a processing facility for the lock box. As noted previously, other applications include locations such as brokerage offices, which take in significant numbers of checks payable to themselves or to one of their customers. Thus, transportation costs and delays in obtaining access to funds are minimized by placing one of these devices within the office itself. Such an application can also include any corporate environment where large numbers of checks are taken in, wherever the corporation has difficulty and cost associated with transporting checks. Yet still further, another application is in the overseas collection of checks drawn on U.S. banks in U.S. Dollars. Scanning devices are placeable overseas and checks may be accepted, voided their images sent to the United States and entered into the collection system. As noted previously, in addition to processing of checks, the system can be used to process currency and a typical image deposit flow for both checks and cash at an ATM/CAT is further illustrated in FIG. 8.

Figure 8:
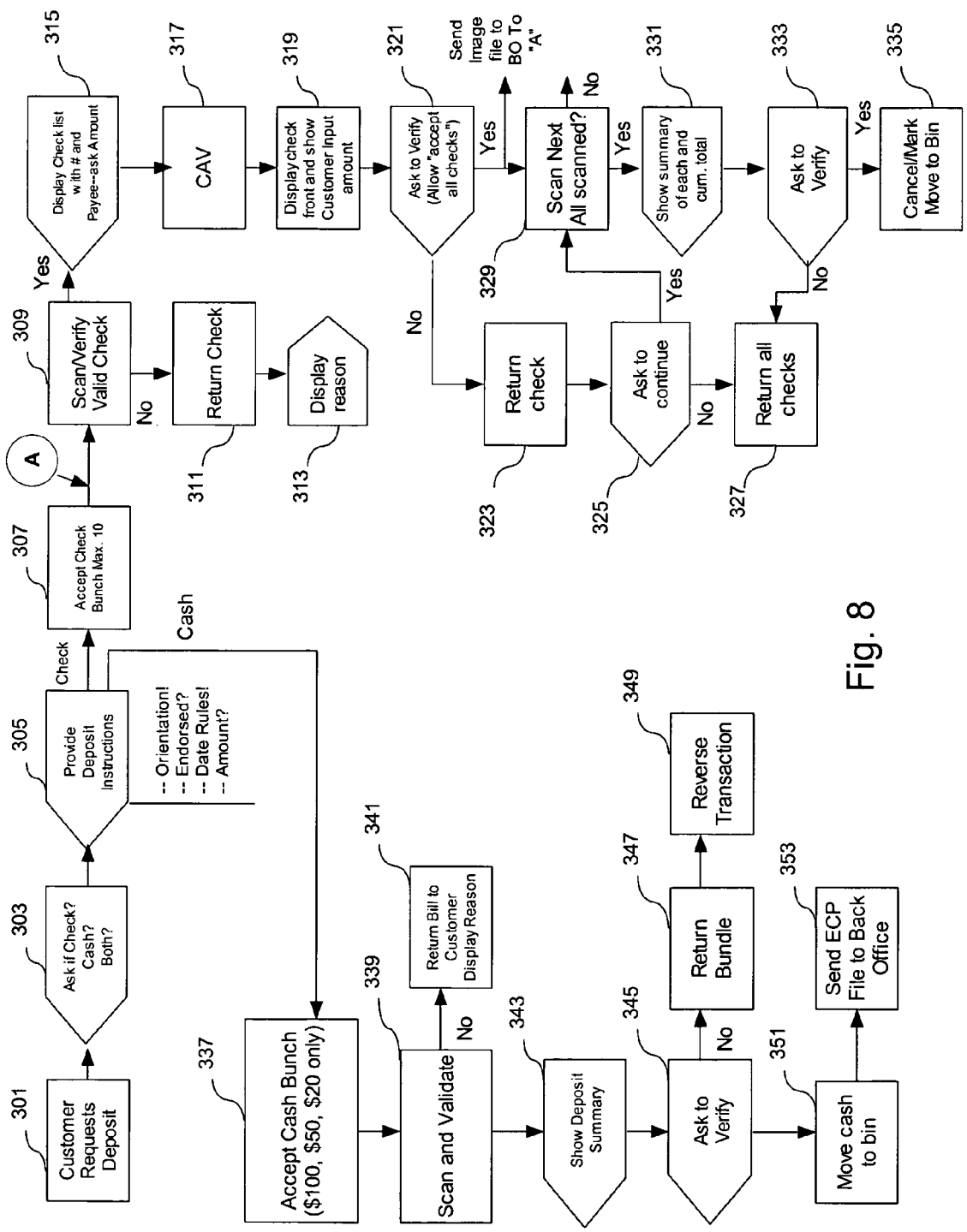
FIG. 8 is a flow diagram illustrating the image deposit flow when the initial scan is implemented at an ATM.

Specifically, as illustrated in FIG. 8, at step 301*a* customer requests a deposit. The ATM/CAT queries the customer at step 303 to determine if the deposit is a check, cash or both. Deposit instructions are provided at step 305 and if the deposit is a check, the checks are accepted at step 307 in bunch maximums of, for example, ten. The checks are scanned and verified and validated at step 309. If the verification operation does not validate the check, the check is returned at step 311 and the display at the ATM/CAT displays the reason for returning the check at step 313. If the checks are verified and validated, a check list is displayed at step 315 on the ATM/CAT display with the number and the payee, and the amount is validated by a separate entry by the customer at step 317 where a customer amount validation is entered. If the amounts match, the customer is asked to verify and accept all checks at step 321. If this is done, an image file is transmitted. Upon the next scan, a query is made as to whether all the checks have been scanned and if the answer is no, the process returns to step "A" to scan the next check from step 329. Once all checks are scanned, a summary of each is displayed at step 331 along with the total, and the customer is asked to verify the amount at step 333. If the customer verifies the amounts, the checks are canceled and so marked at step 335, and moved to the storage bin at the ATM/CAT.

Returning to step 321, if the verification fails, the check is returned at step 323 and the customer is requested at step 325 if they wish to continue. If the answer is yes, the process moves to step 329 and proceeds as described previously. If the answer is no, all the checks are returned at step 327.

Turning now to a deposit of cash as shown on the left hand of the flow diagram of FIG. 8, at step 337, a determination is made as to whether to accept the cash as single notes or collectively as a bunch, according to the capability of the mechanism and the desire of the customer, and preferably accepted only in $100, $50 and $20 Dollar bills. The cash bills are scanned and validated at step 339 and if they do not scan correctly they are returned to the customer at step 341 with the reason for the return displayed. On the other hand, if accepted, at step 343 a deposit summary is shown and the customer is asked at step 345 to verify the deposit summary. If the customer fails to verify the deposit summary, the bundle is returned at step 347 and the transaction is reversed at step 349. If verification proceeds, the cash is moved to the storage bin at step 351 and file is sent to the back office at step 353.

Figure 9:
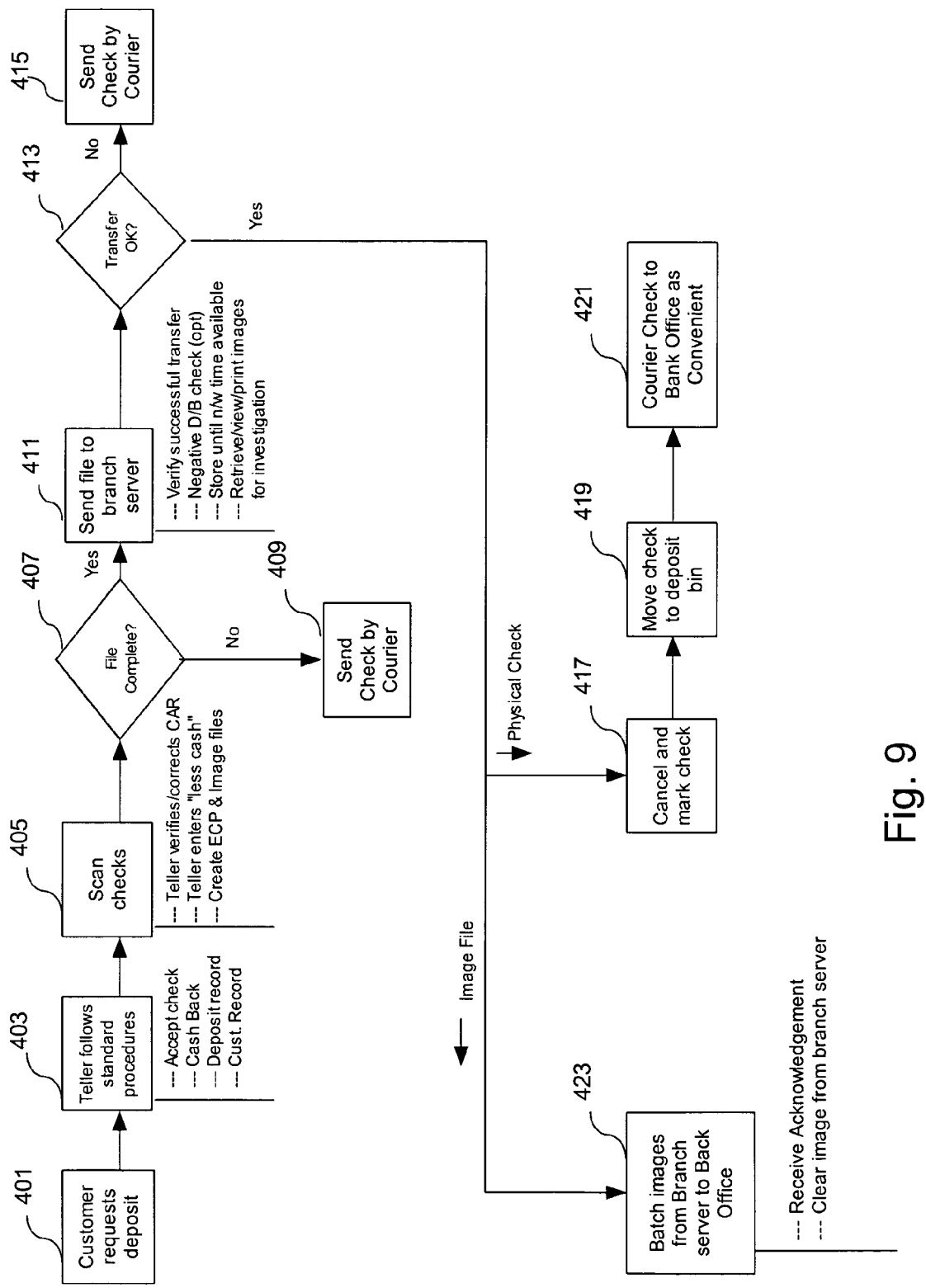
FIG. 9 is a flow diagram illustrating image deposit flow when the initial scan occurs at a teller station.

In an alternative flow of the present invention, FIG. 9 shows a typical image deposit flow when a teller station is the point of deposit. Specifically at a step 401, a customer asks to deposit a check, including possibly receiving cash back, establishing both a deposit as well as a customer record.

Specifically, the teller follows standard procedures at step 403. At a step 405, the checks are scanned and the teller verifies and corrects the account information, and if appropriate enters "less cash". An MICR and image file are created. If the file is complete, at step 411, the file is transmitted to the branch server as shown in FIG. 9 for various routine operations as shown. At that point at a step 413, a further query is made and if the transfer is not okay, then the unscanned check is again sent by courier at step 415. On the other hand, if this transfer is okay, the physical check is then canceled and marked at step 417 and moved into a deposit bin at step 419 and later couriered to the back office at step 421, as convenient. The image file is transmitted in batch form at step 423 from the branch server to the back office and an acknowledgment is then received by the teller and the image is cleared from the branch server. Alternatively, the files can be transmitted throughout the day.

Figure 10:
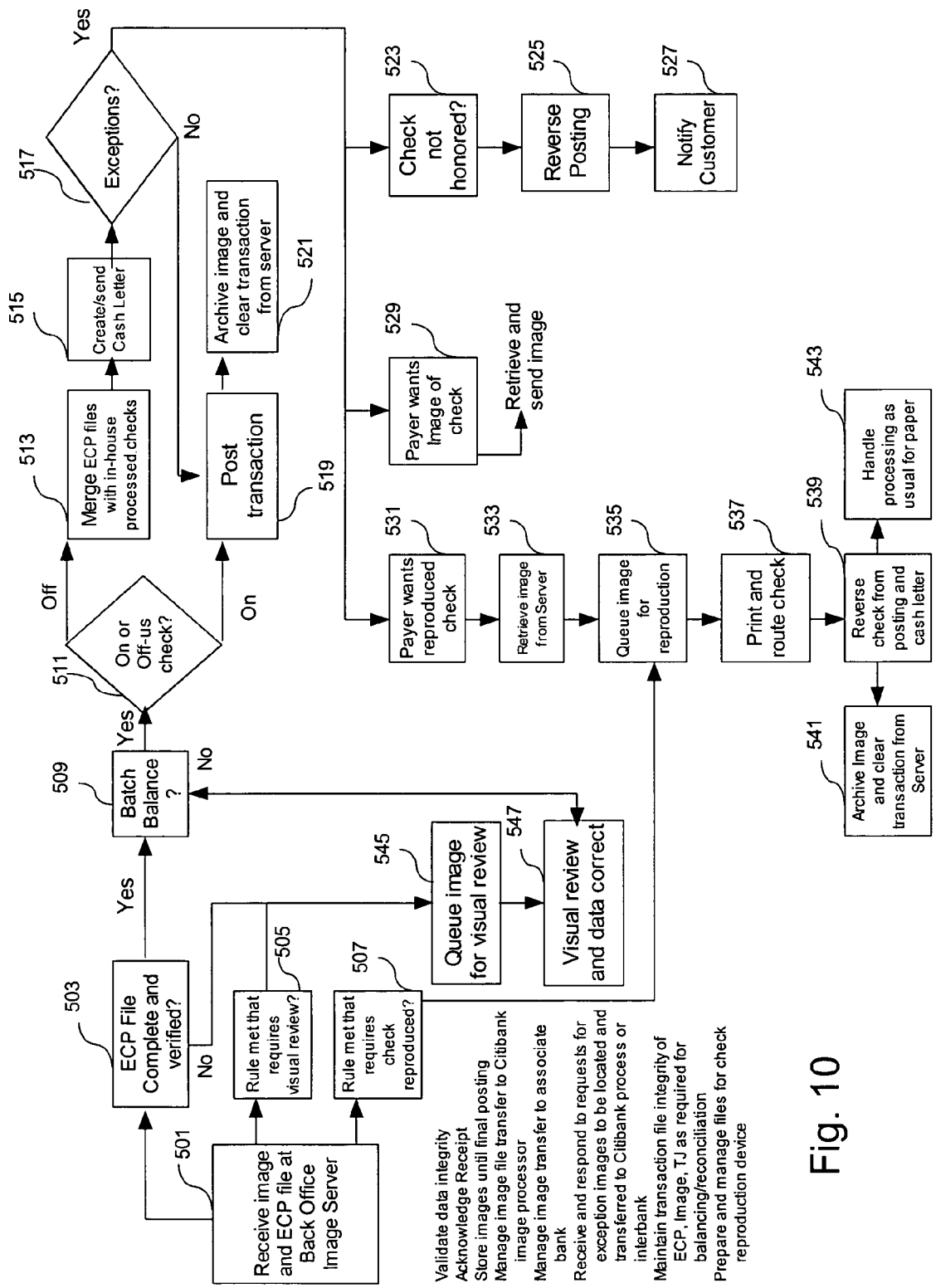
FIG. 10 is a flow diagram illustrating what occurs after image depositing at the back office check processing center.

FIG. 10 illustrates in flow diagram form the operations at the back office check processing center when an image such as a check image is received at the back office image server at a step 501. As shown therein, a number of initial operations are made before further processing. In one instance, if certain rules are met at a step 507 which requires that the check be reproduced, a number of steps are avoided and the check is queued at a step 527, after a number of steps discussed hereafter, for reproduction from the image. Alternatively, it may be required merely that the image be reviewed visually at a step 505, in which case it is queued for visual review and then reviewed and transmitted back to the step 507, as explained hereinafter.

If all data is received at step 507, credits are posted to accounts, as well as float and delays at step 509. If it is determined it is the bank's check at step 511, the check is posted at step 513 and the image archived at step 515.

If it is another bank's check, the payor banks presentment preference is determined at step 517, as well as the routing preference at step 519. It then is transmitted as an ECP, ACH or Image, at 521, 523 or 525.

If the preference is for an MICR facsimile at 527, as described previously, a paper facsimile (MEF) is created as a paper document at 529 and sent to the local Federal or clearinghouse 533. Alternatively, it is sent direct to payor bank 535 or third party for posting its own checks and creating the paper image 537, and then forward to steps 531 or 533 as before.

Thus, as can be appreciated from the previous description, the invention encompasses three sources of check and cash deposits. Specifically, full function ATM or CAT, deposit-only self-service terminals, and branch teller assisted operations are supported by the system.

With respect to the image deposit ATM, preferably, the image capable ATM will replace traditional envelope depositor functions with a check imager/depositor and a cash acceptor. As noted previously, two separate cash and check entry points may be used, but may also be combined into one entry point for scanning. The ATM is configured to validate check items through MICR code line and OCR software as well as being capable of validating currency deposit items. A display permits presentment of the image of each check on the customer display and the machine allows the customer to input check amounts, using courtesy and legal amount recognition software to assist as appropriate. It has the capability of printing the transaction record with image of selected elements of the check as well as compile deposit information such as deposit account number, check courtesy amount, MICR code line data, cash deposit details (number of notes of each denomination, and total cash), and total deposit amount, to produce a facsimile of a deposit slip for the check processing center. The automatic teller machine includes software to compress, encrypt and digitally sign the check for transmission to a secure processing center, and has the capability to store the deposit image and information in a recoverable manner until it has been transmitted to and acknowledge by a secure processing center.

With respect to the check scanning or accepting device, it is preferably configured to accept personal and business size checks. It is capable of capturing MICR line data per banking standards, and is able to reject items, under software control, which do not have recognizable MICR code. It preferably captures a gray scale image of both sides of the check with a spatial resolution of at least 200 dots per inch and gray scale of 256 levels (8 bits per dot). It has the capability to hold the check items in escrow until the customer and ATM software algorithms decide whether to accept the check for deposit. Rejected checks may be returned unmarked to the customer under program control. After the acceptance decision is made, programmable endorsement and cancellation information is applied on the back of the check with an inkjet printer module and ink stamps. The front of the check must be printed to indicate that the check has been voided or the check must be destroyed. The accepted check is then transported to a storage bin in the automatic teller machine. The scanner is configured to accept from one to ten checks in a bunch. Similarly, it is also capable of accepting cash. More typically, it is configured to validate and accept U.S. paper notes in specified denominations. As is well-known, this type of technology is readily available such as with change machines currently in use which can be improved in a routine and conventional manner. Thus, the unit is capable of accepting at least 98% of valid notes in good condition, and reject all counterfeit notes.

With respect to the image server, it provides rudimentary storage and manual processing of check image files transmitted from the automatic teller machine. Examples of software which is readily commercially available for use on the image server includes the Microsoft Windows NT 4.0 Server Operating System, SQL Database, Visual Basic 5.0 Environment, and commercial graphic tools such as Lead Tools, Adobe Photoshop and Pegasus Tool Kits. The print server will provide a framework for MICR printer management software, and will be connected to the image server through a local area network and to the MICR printer either through a local area network, dedicated Ethernet LAN, Centronics or SCSI. The print server includes conventional software to prepare check reproduction jobs using commercial software such as Adobe Photoshop, or through PCL 5. The print server software may include Windows NT 4.0 Server Operating System and printer drivers for the attached MICR printer. In addition, Visual Basic or C++ may be used to transfer check images and MICR code line data either manually or automatically from the image server through Ethernet LAN. The MICR code line data is transferred to PCL fine language and transmitted to the MICR printer with print format data and check image file data. A JPEG image file within a TIFF capture file will be rendered into graphics data for the printer by commercially available software tools, such as from Lead Tools or Pegasus. The printer server application will generate a page or pages containing the front and back images of reproduced checks for each deposit transaction. One side of the page will contain only check front images, and the other side of the page will contain only check back images. The front and back images for each check must be registered accurately to allow the subsequent cutter operation to generate usable reproductions.

For the high speed MICR printer, an MICR laser printer such as one available from Hewlett Packard under the commercial name HP5000, with MICR modifications, can be used to generate paper reproductions of check images. Such a printer is typically capable of printing more than twenty-five pages per minute in text mode. The printer must be capable of encoding MICR code line data on the reproduction to ANSI standards, using the original check's captured MICR code line data as input.

Conventional paper cutters and check readers/sorters can be employed in the system. An example of a check reader/sorter which can be used is one available from NCR Corporation under the commercial name NCR7780, a dedicated controller under the name NCR3349-2030 with LAN connection is supplied with the sorter.

Thus, as can be appreciated, the specific elements, including the various aspects of the network provide the various means and functionality for the system as described in the summary of the invention previously, as well as set forth in the claims, as will be readily apparent to those of ordinary skill in the art.

Having thus generally described the invention, the same will become better understood from the appended claims in which it is set forth in an nonlimiting matter, and for which variations thereof may be encompassed by the appended claims.

What is claimed is:

1. A method for image based transactions, comprising, the steps of:

scanning via a first computer software process executing on an imaging station computer hardware device a front face and a back face of cash received for deposit at a first location and creating via the first computer software process executing on the imaging station computer hardware device an electronic validation of deposited cash;

transmitting by a second computer software process executing on the imaging station computer hardware device the electronic validation of deposited cash from the first location via an imaging server to an image database at a second location; and processing a transaction at the second location with the electronic validation of deposited cash via at least one of a computer software process executing on an edit and validation computer hardware terminal device, a computer software process executing on an encoder computer hardware device, a computer software process executing on an image printer computer hardware device, and a computer software process executing on a sorter/imager computer hardware device, each coupled to the image database.

2. The method of claim 1, further comprising the step of displaying an image of the scanned cash on a terminal display at the first location to provide confirmation to a customer that the deposit has been accepted.

3. The method of claim 2, further comprising separately entering the amount of the cash which has been scanned, comparing the amount entered with the amount scanned, and when the scanned amount matches the entered amount, conducting the processing of the transaction.

4. A system for conducting image based transactions, comprising:

a first computer software process executing on an imaging station computer hardware device that scans a front face and a back face of cash accepted as a deposited item at a first location and creates an image of the deposited cash;

a second computer software process executing on the imaging station computer hardware device that creates and transmits an electronic validation of deposited cash from the first location via an imaging server to an image database at a second location; and at least one of a computer software process executing on an edit and validation computer hardware terminal device, a computer software process executing on an encoder computer hardware device, a computer software process executing on an image printer computer hardware device, and a computer software process executing on a sorter/imager computer hardware device, each coupled to the image database, via which a transaction with the electronic validation of deposited cash is processed at the second location.

5. The system of claim 4, further comprising a display screen of the imaging station computer hardware device located at the first location that displays an image of the scanned cash and provides visual confirmation to a customer that the deposit has been accepted.

6. A method for image based transactions, comprising the steps of:

scanning via a first computer software process executing on an imaging station computer hardware device a front face and a back face of an original paper check received for deposit at a first location and creating via the first computer software process executing on the imaging station computer hardware device a deposited check;

transmitting by a second computer software process executing on the imaging station computer hardware device an image of the scanned deposited check from the first location via an imaging server to an image database at a second location; and processing a transaction at the second location with the scanned image of the deposited check via at least one of a computer software process executing on an edit and validation computer hardware terminal device, a computer software process executing on an encoder computer hardware device, a computer software process executing on an image printer computer hardware device, and a computer software process executing on a sorter/imager computer hardware device, each coupled to the image database, without pickup of the original paper check received at the first location.

7. The method of claim 6, wherein said processing comprises crediting a deposit in the amount of the check to a customer's account.

8. The method of claim 7, further comprising displaying an image of the scanned check on a terminal display at the first location to provide confirmation to a customer that the deposit has been accepted.

9. The method of claim 6, wherein the scanning is conducted on the check and further comprising recreating the image of the scanned deposited check onto paper.

10. The method of claim 9, wherein said recreating of the check onto paper further comprises cutting the paper to the size of a check.

11. The method of claim 10, wherein said recreating of the check onto paper is done at the second location.

12. The method of claim 6, wherein said first location is an automatic teller machine, owned and operated by a bank for its customers, having a scanner and display, and the method further comprising storing the scanned check in the automatic teller machine.

13. The method of claim 9, further comprising recreating the scanned deposited check into a paper image which is Magnetic Image Character Recognition (MICR) encoded.

14. The method of claim 6, further comprising separately entering the amount on the check which has been scanned, comparing the amount entered with the amount scanned, and when the scanned amount matches the entered amount, conducting the processing of the transaction.

15. The method of claim 6, further comprising composing, encrypting and digitally signing the check before the transmission to the second location for processing.

16. The method of claim 6, wherein said first location is an automatic teller machine that is at least one of owned and operated by someone other than the owner of the second location.

17. The method of claim 6, wherein said first location is a branch of a bank.

18. The method of claim 6, wherein said first location is a retail business location.

19. The method of claim 6, wherein said first location is a business.

20. The method of claim 6, wherein said first location is outside the United States.

21. The method of claim 6, further comprising voiding said check at the first location by printing on the check or destroying the check.

22. The method of claim 6, further comprising endorsing the check.

23. The method of claim 14, further comprising transmitting the image to another location to display to an operator for resolution when the amounts entered and scanned differ.

24. The method of claim 6, further comprising comparing the information on the check to information contained in a file of indicators of potential loss.

25. The method of claim 6, further comprising maintaining a file of payor bank preferences for how the payor bank will receive presentment, and processing the transaction in accordance with the preferences.

26. The method of claim 25, further comprising using the information in the payor bank preference file to determine whether presentment will be by paper, Extended Capabilities Port (ECP), image, or Automatic Clearing House (ACH).

27. The method of claim 6, further comprising maintaining a file of routing preferences, and processing the transaction in accordance with the preferences.

28. A system for conducting image based transactions, comprising:
    a first computer software process executing on a scanner computer hardware device located at a first location that scans a front face and a back face of an original paper check accepted as a deposited item at a first location and creates an image of a deposited check;
    a second computer software process executing on the scanner computer hardware device that transmits an image of the scanned deposited check from the first location via an imaging server to an image database at a second location; and
    at least one of a computer software process executing on an edit and validation computer hardware terminal device, a computer software process executing on an encoder computer hardware device, a computer software process executing on an image printer computer hardware device, and a computer software process executing on a sorter/imager computer hardware device, each coupled to the image database, via which a transaction with the image of the scanned deposited check is processed at the second location without pickup of the original paper check received at the first location.

29. The system of claim 28, wherein said transaction is processed with the same information as when the original was available.

30. The system of claim 29, wherein said transaction is processed at least in part by crediting a deposit in the amount of the scanned check to an account of the customer.

31. The system of claim 30, further comprising a display located at the first location for displaying an image of the scanned check, for providing visual confirmation to a customer that the deposit has been accepted.

32. The system of claim 28, further comprising a printer that recreates the check as an image on paper, and composited with machine readable regenerated Magnetic Image Character Recognition (MICR) encoding of the original check's Magnetic Image Character Recognition (MICR) code line data.

33. The system of claim 32, wherein said printer is located at the second location.

34. The system of claim 28, further comprising an automatic teller machine having said scanner thereon at the first location, and having a secured container region therein for storing scanned checks in the automatic teller machine.

35. The system of claim 32, wherein said printer recreates the scanned image into a paper image which is Magnetic Image Character Recognition (MICR) encoded, and composited with machine-readable regenerated Magnetic Image Character Recognition (MICR) encoding of the original check's Magnetic Image Character Recognition (MICR) code line data.

36. The system of claim 28, further comprising an input device of the scanner computer hardware device via which entry of an amount on the check which has been scanned is separately received; and a third computer software process executing on the scanner computer hardware device that compares the amount entered with an amount scanned and allows transmission to conduct processing of the transaction.

37. The system of claim 28, further comprising a fourth computer software process executing on the scanner computer hardware device that compresses, encrypts and digitally signs the scanned check before transmission to the second location for processing.

38. The system of claim 28, further comprising one of the computer software process executing on the encoder computer hardware device at the second location and the computer software process executing on the image database at the second location that sends the image of the scanned deposited check received by the image database to a third location for processing within or for another bank.

39. The system of claim 28, further comprising the computer software process executing on the image database at the second location that sends the image of the scanned deposited check received by the image database to a Federal Reserve Bank or one of its offices or a clearinghouse as a third location, and the third location has means for creating the images on paper and Magnetic Image Character Recognition MICR encodes them for entry into the check processing system or sending the information to a bank for payment.

40. The system of claim 28, further comprising the computer software process executing on the image database at the second location that sends the image of the scanned deposited check received by the image database directly to a payor bank or its processing agent or correspondent for payment.

41. The system of claim 28, further comprising a device having said scanner computer hardware device thereon at the first location, and having a secured container region therein for storing scanned checks at a branch of a bank.

42. The system of claim 28, further comprising a device having said scanner computer hardware device thereon at the first location, and having a secured container region therein for storing scanned checks at a business.

43. A method for image based transactions, comprising:
  scanning via a first computer software process executing on an imaging station computer hardware device a front face and a back face of an original paper check received for deposit at a first location and creating via the first computer software process executing on the imaging station computer hardware device a deposited check;
  transmitting by a second computer software process executing on the imaging station computer hardware device an image of the scanned deposited check from the first location via an imaging server to an image database at a second location; and
  processing a transaction at the second location with the scanned image of the deposited check via at least one of a computer software process executing on an edit and validation computer hardware terminal device, a computer software process executing on an encoder computer hardware device, a computer software process executing on an image printer computer hardware device, and a computer software process executing on a sorter/imager computer hardware device, each coupled to the image database, without verification of a signature of a user initiating the transaction, which signature is used to verify that the user is a profiled user with a specified system, and without pickup of the original paper check received at the first location.

44. The method of claim 43, wherein said transaction is cashing the check.

45. The method of claim 43, wherein said transaction is depositing the check amount in a user's account.

46. The method of claim 43, wherein said transaction is making a purchase at a vendor, with the vendor location being said first location.

47. The method of claim 43, wherein said transaction is conducted between unrelated systems, wherein said first location is part of one network and said second location is part of a second network.

48. A system for conducting image based transactions, comprising:
  a first computer software process executing on a scanner computer hardware device located at a first location that scans a front face and a back face of an original paper check accepted as a deposited item at a first location and creates an image of a deposited instrument;
  a second computer software process executing on the scanner computer hardware device that transmits an image of the scanned deposited check from the first location via an imaging server to an image database at a second location; and
  at least one of a computer software process executing on an edit and validation computer hardware terminal device, a computer software process executing on an encoder computer hardware device, a computer software process executing on an image printer computer hardware device, and a computer software process executing on a sorter/imager computer hardware device, each coupled to the image database, via which a transaction with the image of the scanned deposited check is processed at the second location without verification of a signature of a user initiating the transaction, which signature is used to verify that the user is a profiled user within a specified system, and without pickup of the original paper check received at the first location.

49. The system of claim 48, wherein said system is configured for conducting cashing of the check.

50. The system of claim 48, wherein said system is configured for conducting a deposit of the check amount in a user's account.

51. The system of claim 48, wherein said first location is a vendor location, said second location is a bank location, and said system is configured to allow making a purchase at the vendor location.

52. The system of claim 48, wherein said first location is part of one network and said second location is part of a second network.

53. A method for image based transactions, comprising the steps of:
  receiving for deposit via a first computer software process executing on a self-service transaction terminal computer hardware device at a first location a check having a front face and a back face, wherein the check is an original paper check;
  scanning via a second computer software process executing on the self-service transaction terminal computer hardware device the front face and the back face of the paper check and creating via the second computer software process executing on the self-service transaction terminal computer hardware device a deposited check;
  marking via a third computer software process executing on the self-service transaction terminal computer hardware device the paper check with an indicia of non-negotiability and storing by the third computer software process executing on the self-service transaction terminal computer hardware device the marked paper check in a depository at the first location;
  transmitting by a fourth computer software process executing on the self-service transaction terminal computer hardware device an image of the scanned deposited check from the first location via an imaging server to an image database at a second location; and
  processing a transaction at the second location with the scanned image of the deposited check via a computer software process executing on an edit and validation computer hardware terminal device coupled to the image database.

54. The method of claim 53, further comprising storing the paper check by the third computer software process executing on the self-service transaction terminal computer hardware device for a pre-determined delay period before pickup of the original paper check.

55. The method of claim 53, further comprising storing the paper check by the third computer software process executing on the self-service transaction terminal computer hardware device without pickup of the original paper check.

56. A system for conducting image based transactions, comprising:
  a first computer software process executing on a self-service transaction terminal computer hardware device via which a check having a front face and a back face is accepted as a deposited item at a first location, wherein the check is an original paper check;
  a second computer software process executing on a scanner computer hardware device coupled to the self-service transaction terminal computer hardware device located at the first location that scans the front face and the back face of the check and creates an image of a deposited check;
  a third computer software process executing on the self-service transaction terminal computer hardware device via which the original paper check is marked with an indicia of non-negotiability and stored in a depository at the first location;

a fourth computer software process executing on the self-service transaction terminal computer hardware device that transmits an image of the scanned deposited check from the first location via an imaging server to an image database at a second location; and a computer software process executing on an encoder computer hardware device coupled to the image database, via which a transaction with the image of the scanned deposited check is processed at the second location.

57. The system of claim 56, further comprising the third computer software process executing on the self-service transaction terminal computer hardware device that stores the original paper check for a pre-determined delay period before pickup of the original paper check.

58. The system of claim 56, further comprising the third computer software process executing on the self-service transaction terminal computer hardware device that stores the original paper check without pickup of the original paper check.

59. A method for image based transactions, comprising:
receiving for deposit via a first computer software process executing on a self-service transaction terminal computer hardware device at a first location a check having a front face and a back face, wherein the check is an original paper check;

scanning via a second computer software process executing on the self-service transaction terminal computer hardware device the front face and the back face of the original paper check and creating via the second computer software process executing on the self-service transaction terminal computer hardware device a deposited check;

marking via a third computer software process executing on the self-service transaction terminal computer hardware device the original paper check with an indicia of non-negotiability and storing by the third computer software process executing on the self-service transaction terminal computer hardware device the marked original paper check in a depository at the first location;

transmitting by a fourth computer software process executing on the self-service transaction terminal computer hardware device an image of the scanned deposited check from the first location via an imaging server to an image database at a second location; and processing via a computer software process executing on an image printer computer hardware device coupled via a check imaging server to the image database a transaction at the second location with the scanned image of the deposited check without verification of a signature of a user initiating the transaction, which signature is used to verify that the user is a profiled user with a specified system.

60. The method of claim 59, further comprising storing the paper check by the third computer software process executing on the self-service transaction terminal computer hardware device for a pre-determined delay period before pickup of the original paper check.

61. The method of claim 59, further comprising storing the original paper check by the third computer software process executing on the self-service transaction terminal computer hardware device without pickup of the original paper check.

62. A system for conducting image based transactions, comprising:
a first computer software process executing on a self-service transaction terminal computer hardware device via which a check having a front face and a back face is accepted as a deposited item at a first location, wherein the check is an original paper check;

a second computer software process executing on a scanner computer hardware device coupled to the self-service transaction terminal computer hardware device located at the first location that scans the front face and the back face of the check and creates an image of a deposited check;

a third computer software process executing on the self-service transaction terminal computer hardware device via which the original paper check is marked with an indicia of non-negotiability and stored in a depository at the first location;

a fourth computer software process executing on the self-service transaction terminal computer hardware device that transmits an image of the scanned deposited check from the first location via an imaging server to an image database at a second location; and a computer software process executing on a sorter/imager computer hardware device coupled to the image database via which a transaction with the image of the scanned deposited check is processed at the second location without verification of a signature of a user initiating the transaction, which signature is used to verify that the user is a profiled user within a specified system.

63. The system of claim 62, further comprising the third computer software process executing on the self-service transaction terminal computer hardware device that stores the original paper check for a pre-determined delay period before pickup of the original paper check.

64. The system of claim 62, further comprising the third computer software process executing on the self-service transaction terminal computer hardware device that stores the paper check without pickup of the original paper check.

\* \* \* \* \*